Dec. 3, 1957  L. G. BRAUNSTEIN ET AL  2,815,075
FILM CUTTER
Filed March 28, 1955  2 Sheets-Sheet 1

Fig. 1

INVENTORS
LEE G. BRAUNSTEIN
FREDERICK W. KULICKE JR.
BY Arthur H. Seidel
ATTORNEY

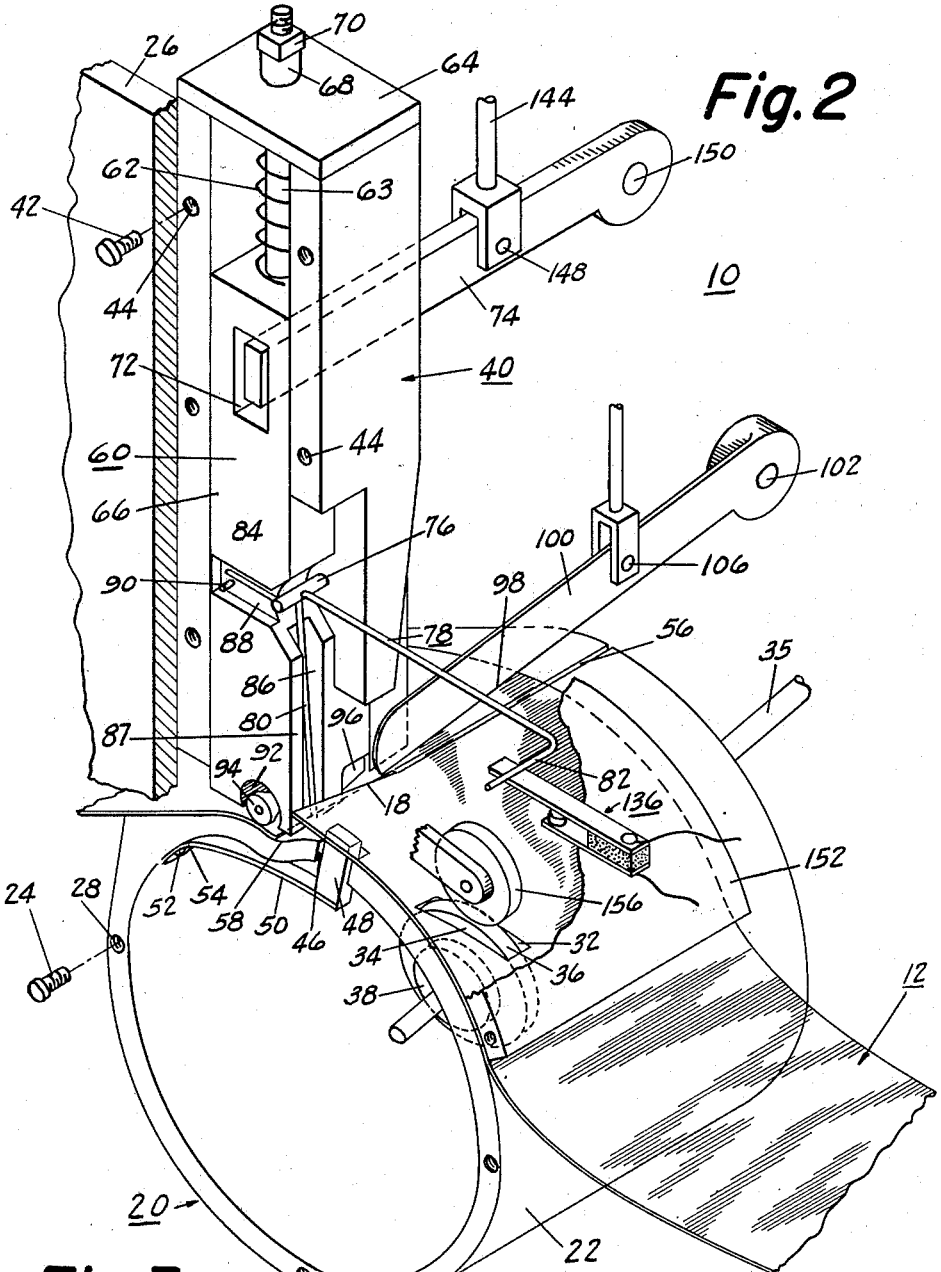

United States Patent Office 2,815,075
Patented Dec. 3, 1957

2,815,075

FILM CUTTER

Lee G. Braunstein and Frederick W. Kulicke, Jr., Philadelphia, Pa.

Application March 28, 1955, Serial No. 497,336

7 Claims. (Cl. 164—42)

The present invention relates to a film cutting apparatus, and refers more particularly to a device for rapidly separating strips of negative film of any size into the individual exposures constituting the strip.

In conventional photofinishing establishments rolls of exposed negative film are automatically developed, washed, dried and printed. Such negative film normally comprises strips which are several feet in length, and which bear from six to thirty-six or more exposures. The number of exposures on a strip and the area encompassed by each exposure differs from film size to film size. Within a given film size, the number of exposures and their size may vary dependent upon the type camera that is used.

The width of each spacing area between exposed negative frames is never perfectly equal as the spacing area between negatives is determined by the manual winding of the film in the camera between exposures, and human error renders equal distribution of the spacing areas impossible. It is for this reason that a negative cutter cannot be set to cut film being fed through it at equally spaced distances along the roll.

A film cutting machine for negatives must therefore be capable of detecting the spacing area intermediate exposed frames where the cut must be made.

A proposed detecting means for locating such spacing area is a photo-electric cell. The use of such means is bottomed on the basis that since the spacing area between exposed negative frames is clear film (cellulose acetate, or cellulose nitrate, or the like) a beam of light would pass through this clear area and actuate the photo-electric cell. However, this technique is unsatisfactory because many exposed negatives comprise clear areas which would also actuate the photoelectric cell.

Automatic manipulation of film negatives is also rendered difficult by the relatively low hardness of the plastic material of which such negatives are made, and the concomitant proneness on the part of such material towards scratching when excessively manipulated. As scratches on a negative destroy its utility, an automatic negative cutter must be so constructed as to avoid scratching the face of exposed negative frames.

The handling of negative strips in contradistinction to positive strips is further complicated by the relatively adverse static electricity properties of negative film materials as compared to positive printing paper. These static electricity properties frequently cause negative film to stick to surfaces and hamper its automatic manipulation.

Thus, while film positives or prints are prepared on long rolls of sensitive paper and cut automatically, such positives having been printed by semi-automatic equipment, which prints the positives at mechanically regulated intervals, followed by the processing and drying of the positives in automatic machinery, even the largest and best equipped photofinishing establishments still cut each exposed negative frame by hand.

This invention has as an object the provision of a film cutter for negative film strips capable of accurately and rapidly severing exposed frames.

A further object of the present invention is the provision of a film cutter for negative film strips which will not mar the surface of the film strip.

A still further object of the present invention is the provision of a film cutter for negative film strips which accurately detects the unexposed spacing area between exposed frames and which then signals the cutting knife to effect the cut.

Another object of the present invention is the provision of a film cutter for negative film which will not cut except in response to a signal received from the film.

Another object of the present invention is the provision of a film cutter for negative film strips which will evenly advance the film strip and present the film to the cutting knife at right angles to the film's major dimension.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1 is an elevational and partly diagrammatic view of the film cutter of the present invention.

Figure 2 is a fragmentary perspective view, partly in section and with parts broken away for clarity, of the feeding, sensing, signalling and cutting means of the present invention.

Figure 3 is a plan view of a strip of negative film that has been notched so that it may be utilized in the film cutter of the present invention.

Referring to the drawings 10 designates the film cutter of the present invention.

A strip 12 of negative film comprising a plurality of exposed frames 14 separated from each other by parallelogram-shaped spacer areas 16 of unexposed film is cut into separate frames by film cutter 10.

Film strip 12 may be made of synthetic plastic material, such as cellulose acetate, cellulose nitrate, or the like.

Prior to being conveyed to film cutter 10 the film strip 12 was passed through a semi-automatic printer wherein each exposed frame 14 was in turn centered in a printer mask by an operator. When so centered, the frame was in juxtaposed alignment with a strip of positive printing paper, and the operator passed a beam of light through the frame 14 exposing the printing paper.

Semiautomatic printers of the aforesaid type are widely used in the photofinishing arts, one such commercial printer being the "Pakomatic Printer Model 45" made by the Pako Corporation, 1010 Lyndale Avenue North, Minneapolis, Minnesota.

As described in copending application for Letters Patent Serial No. 497,259, filed on even date herewith, semi-automatic printers may be equipped with a notching or cutting mask, which will notch the negative strip 12 intermediate exposed frames 14, when each frame 14 is aligned in the printing mask.

The notches 18 in spacer areas 16 intermediate exposed frames 14 of film strip 12 are made by a cutting mask, such as that described in copending application Serial No. 497,259 and extend inwardly along one free edge of film strip 12. No film material is removed from film strip 12 to form notches 18, rather the film is merely slit along one edge by a razor or other sharp edge.

Notches 18 in the film strip 12 are not extensive enough to weaken film strip 12 and thus prevent it from being drawn as a web longitudinally, nor are the lips of notches 18 depressed or elevated out of the plane of film strip 12 thereby interfering with the sliding conveyance of the film strip on a supporting surface.

Film cutter 10 comprises a generally tubular negative track 20 of metal having a smooth finished outer surface 22. Negative track 20 is fixedly secured as by bolts 24 to retainer wall 26, bolts 24 being received in threaded openings 28 in face 30. Face 30 is flush against the juxtaposed surface of retention wall 26, and negative track 20 is rigidly secured in place on retention wall 26.

Negative track 20 is slotted on its upper surface to form friction wheel opening 32 through which friction wheel 34 projects.

Friction wheel 34 is capped with rubber tire 36 of smooth rubber. Friction wheel 34 is not parallel to retainer wall 26, but is skewed slightly, such as at a one degree angle in respect thereto. Thus, the diametric end of friction wheel 34 closest to the uppermost portion of negative track 20 is slightly closer to retainer wall 26 than the opposite diametric end of friction wheel 34. As will be more fully explained below, this slight skewing of friction wheel 34 serves the important purpose of urging the film strip 12 towards the retainer wall 26.

Friction wheel 34 is not splined to its shaft 35 but is frictionally held between friction plates 38, which are splined to the friction wheel shaft 35. Thus, friction wheel 34 normally rotates upon its shaft 35; however, in response to a force on rubber tire 36 of friction wheel 34 exceeding the frictional forces exerted by friction plates 38, friction wheel 34 will remain stationary. Thus, friction wheel 34 and friction plates 38 comprise an overload clutch. Stop plunger housing 40 is fixedly secured against retention wall 26 by bolts 42, which are received in threaded openings 44.

Negative track 20 is slotted proximate housing 40 and adjacent retainer wall 26 to provide separator foot opening 46 through which separator foot 48 is urged upwardly as by leaf spring 50. Leaf spring 50 is fixedly secured by bolt or rivet 52 to the inner face 53 of negative track 20. Separator foot 48 may also be spot welded to retainer wall 26 at 54.

A blade-receiving slot 56 is provided in negative track 20 adjacent housing 40 at right angles to retainer wall 26. Blade-receiving slot 56 extends from retainer wall 26 and across negative track 20 to a length greater than the widest film strip 12 to be used with film cutter 10.

A sufficient clearance is provided between stop plunger housing 40 and the outer surface 22 of negative track 20 to permit film strip 12 to clear beneath housing 40 and negative track 20. Negative track 20 is cut away in back of housing 40 to form a small depression 58 which has its maximum depth closest to retainer wall 26. The portion of negative track 20 in back of housing 40 is flattened to provide a platform which may be slotted to provide an opening for a conveyor belt to convey cut negative frames from housing 40. The flattened portion of negative track 20 beyond housing 40 prevents overlapping due to passage around a curve, and reduces the forces required to move the negative film 12 around negative track 20. Reciprocally movable stop plunger 60 is guided within stop plunger housing 40. Stop plunger 60 is urged downwardly by plunger spring 62, which comprises a coiled spring encircling rod 63 and seated against plate 64 which is fixedly secured at the top of housing 40.

Rod 63 is fixedly anchored in the upper end of plunger block 66 and is guided by guide 68 on the upper surface of plate 64. Stop means comprising a locknut 70 are carried on the upper end of rod 63; locknut 70 bearing on guide 68 when plunger block 66 is urged downwardly.

Plunger block 66 is provided in its upper portion with an elevator arm opening 72 through which elevator arm 74 projects.

The middle portion of plunger block 66 is provided with a bearing post 76 on which bell crank trip wire 78 is mounted.

Trip wire 78 consists of three arms, namely trip arm 80, switch actuator arm 82, which consists of an angle-shaped member, and stop arm 84; with each of arms 80, 82 and 84 being pivoted about bearing post 76. Arms 80, 82 and 84 are spring-urged counterclockwise by spring 85, e. g. stop arm 84 is urged against stop pin 90 by the action of spring 85.

Trip arm 80 is pivoted within slot 86, which is on stop face 87 of plunger block 66. Trip arm 80 may be pivoted within and without slot 86. Movement of trip arm 80 in any direction (clockwise or counterclockwise), of course, urges switch actuator arm 82 and stop arm 84 in the same direction.

The path of movement of trip arm 80 is confined within predetermined limits by stop arm 84, whose movement is confined between the upper edge of slot 88 and stop pin 90.

The bottom of plunger block 66 is cut away to provide roller cavity 92 in which deflecting idler roller 94 is mounted. The crown of deflecting idler roller 94 is tapered to give maximum bearing on the film.

The bottom portion 96 of stop face 87 spaced beyond slot 86 is furrowed so that the portion of stop face 87 adjacent slot 86 is in advance thereof.

The outer face of stop plunger housing 40 adjacent the side of plunger block 66 carrying slot 86 is machined and serves as a guide for cutting knife blade 98 carried by knife blade carrying-arm 100.

Blade carrying-arm 100 is pivoted about pivot 102 and is driven by connecting rod 104 joined to knife blade carrying arm 100 by pitman 106.

Connecting rod 104 is joined by pin 108 to eccentric 110. Eccentric 110 is splined to driven jack shaft 112 and rotates therewith.

Jack shaft 112, which is supported by bearings 114 and 116, contains a roller type single revolution clutch 118 of conventional design. A suitable roller type single revolution clutch is that manufactured by the Hilliard Corporation of Elmira, New York, and which is described in their Bulletin No. 239, dated January 1954.

Clutch 118 contains a projection or dog 120 which projects from the crown thereof. The operation of dog 120 will be explained more fully hereinbelow.

Clutch 118 is also engaged with drive shaft 122, which carries pulley 124. Pulley 124 is driven by belt 126 and motor pulley 128 on motor shaft 130.

Dog 120 of clutch 118 is prevented from rotating by armature 132 of synchronizer solenoid 134, when solenoid 134 is not energized. When dog 120 is engaged by armature 132, rotation of jack shaft 112 is not possible. However withdrawal of armature 132 by the energization of solenoid 134 permits the rotation of dog 120, the engagement of clutch 118, and the rotation of jack shaft 112.

The energization of solenoid 134 is effected by switch actuator arm 82. In the lowered position of trip wire 78, namely when trip arm 80 has been forced into slot 86 on face 87 of stop plunger block 66 against the action of spring 85, switch actuator arm 82 closes the solenoid switch 136 energizing solenoid 134 and withdrawing armature 132. In the normal position of trip wire 78, namely when switch actuator arm 82 is urged upwardly by spring 85 and stop arm 84 is resting on stop pin 90, solenoid 134 is not energized and armature 132 is in its exposed position.

A Prony brake 137 of conventional design is provided on jack shaft 112 for operative cooperation with clutch 118.

At the end of shaft 112 remote from clutch 118 is cam 138, which drives cam follower 140 mounted on cam follower arm 142, which pivots on pivot 143 secured to a supporting structure. A connecting link 144 is secured by pivotal connection 146 to cam follower arm 142 and by pivotal connection 148 to elevator arm 74. Elevator arm 74 is pivoted about pivot 150 and is raised or lowered by connecting link 144.

The raising and lowering of stop plunger 60 is effected by elevator arm 74; there being some play at elevator arm opening 74, so that the raising and lowering of plunger 60 is not rigidly coupled to cam 138.

Cam 138 is so constructed that stop plunger 60 will be urged downwardly when knife blade carrying-arm 100 is cutting through the film and will be urged upwardly by elevator arm 74 shortly after (an arc of some 15 degrees or so on cam 138) knife blade carrying-arm 100 is raised from the film. Plunger 60 will again descend when knife blade carrying-arm 100 approaches the film to effect cutting thereof.

A superposed negative track guide 152, which may be of metal, but is preferably of a transparent plastic, such as Plexiglas or Lucite (a methyl methacrylate polymer) or the like, having a degree of curvature similar to that of negative track 20, is placed over negative track 20 in advance of stop plunger housing 40 in order to guide the film strip 12 towards stop plunger 60. Negative track guide 152 is slotted to provide an idler wheel opening through which idler wheel 156 projects. Idler wheel 156 is pivotally secured to retainer wall 26 and rests above the film strip area contacted by friction wheel 34.

Friction wheel shaft 35 carries pulley 158 which is engaged with belt 160 driven by motor pulley 162.

It is advantageous to coat the entire surface of negative track 20 with a non-abrasive soft coating, preferably Teflon (a polymerized tetrafluoroethylene resin made by E. I. du Pont de Nemours of Wilmington, Delaware), on which the negative film strip 12 may be rapidly conveyed without scratching or marring the surface of the film.

The operation of film cutter 10 is as follows:

A film strip 12 containing notches 18 in spacer areas 16 intermediate exposed frames 14 is conveyed onto film cutter 10 and passed intermediate negative track 20 and Plexiglas negative track guide 152 with notches 18 adjacent wall 26.

Friction wheel 34 propels the film strip towards stop plunger 60, and also by virtue of its being skewed in relation to retainer wall 26 urges the film towards wall 26, ensuring that the film will be operatively aligned in respect to stop plunger 60 and cutting knife blade 98.

So long as a notch 18 is not presented to trip arm 80 of trip wire 78 the film proceeds on negative track 20 beneath stop plunger housing 40. However, when a notch 18 is presented, the following sequence of operations occurs.

The lips of the notch are spread apart with the advance or downstream lip urged downwardly by deflecting idler roller 94 into depression 58 and the rear or upstream lip rising on stop face 87 of plunger block 66, said rear lip being urged upwardly by separator foot 48. The cut-away or furrowed bottom portion 96 of stop face 87 ensures the rising of the rear lip thereon, as a camming angle which would permit the film to slide under the stop plunger 60 is lacking. Moreover, the simultaneous lowering of the advance lip and the raising of the rear lip further ensures the rising of the rear lip of the notch on the stop face 87.

The rising of the rear lip of the notch on stop face 87 stops the forward motion of film strip 12. Friction wheel 34 is not splined to its shaft 35, and as the friction exerted upon it by film strip 12 is greater than the friction exerted by its friction plates 38, the friction wheel 34 ceases to rotate.

The rising of the rear notch lip on stop face 87 also urges trip arm 80 into slot 86 against the action of spring 85. This in turn urges switch actuator arm 82 downwardly, closing switch 136 and energizing solenoid 134. Upon the energizing of solenoid 134 its armature 132 is withdrawn, thereby releasing dog 120 of clutch 118, which thereby becomes engaged.

Jack shaft 112 is then rotated causing eccentric 110 to urge knife blade carrying-arm 100 downwardly. Cutting knife blade 98 is guided along the outer face of stop plunger housing 40 and cuts into film strip 12 passing therethrough and into blade-receiving slot 56. As cutting knife blade 98 is longer than the width of the widest film strip to be cut, and as the film strip is always skewed against retainer wall 26, film cutter 10 may be used to cut a variety of sizes of notched film strip.

When cutting knife blade 98 is in its descended or operative position, stop plunger 60 remains down, preventing the passage of film strip 12 therebeneath. As the continued rotation of eccentric 110 causes cutting knife-blade 98 to rise after its cutting stroke, stop plunger 60 is also urged upwardly by elevator arm 74, as rotation of cam 138 raises cam follower 140.

The cut edge of the film strip 12 descends completely from stop face 87 and as the film strip 12 is once again free to move, it is urged forwardly by friction wheel 34. The cut frame may be withdrawn, as by gravity. The forward motion of film strip 12 continues until trip arm 80 again senses a notch 18 in the film strip 12, at which time the aforesaid operation is repeated.

The film cutter of the present invention may be run at elevated speeds, such as at a cutting rate of a plurality of frames per second. The cutting action of the blade is responsive only to a signal notch on the film, and cutting is effected at the notch.

The forward feed of the film is positive, and without jamming or pile-ups, yet scratching or marring of the film is avoided.

The present invention may be embodied in other specific forms without departing from the spirit or essential attributes thereof and, accordingly, reference should be made to the appended claims, rather than to the foregoing specification as indicating the scope of the invention.

We claim:

1. A device for severing individual exposed frames from a strip of film bearing a signal notch intermediate exposed frames which includes a movable cutting-knife having a fixed plane of movement, film feeding means for urging the film strip towards the plane of movement of said cutting-knife, said film feeding means comprising an overload clutch which ceases to urge the film strip towards the plane of movement of said cutting-knife when a signal notch edge is engaged with the stop means, vertically reciprocal stop means spaced from said cutting-knife on the opposite side of the plane of movement of said cutting knife from said film feeding means, said vertically reciprocal stop means being responsive to a signal notch in the film strip and stopping the feeding of said film strip by passing through the plane of the film strip upon encountering a signal notch, means proximate said stop means for urging apart the edges of the signal notch and causing one such edge to be engaged with said stop means after said stop means has passed through the plane of the film strip, sensing means for detecting the engagement of the signal notch edge with the stop means, and cutting-knife driving means responsive to said sensing means for urging said cutting-knife through the strip of film when the signal notch edge is engaged with the stop means.

2. A device for severing exposed frames from a strip of moving film bearing a signal notch intermediate exposed frames which includes a cutting-knife, a vertically reciprocal stop normally riding above the strip, means beneath said stop for permitting said stop to pass through the signal notch in the film strip upon the film strip's passage beneath said stop, said stop having a contact face for engaging with an edge of the signal notch, said contact face having a cavity thereon, a sensing probe arranged to move within and without said cavity, means urging said probe without said cavity, said probe constructed and arranged in relation to the contact face whereby engagement of the stop with an edge of the signal notch urges the probe to within said cavity, and cutting-knife operating means spaced from said stop responsive to the movement of the probe within said cavity.

3. A device for severing exposed frames from a strip of moving film bearing a signal notch intermediate exposed frames which includes a cutting-knife, a vertically reciprocal stop normally riding above the strip, means beneath said stop for permitting said stop to pass through the signal notch in the film strip upon the film strip's passage beneath said stop, said stop having a contact face for engaging with an edge of the signal notch, said contact face having a cavity thereon, a sensing probe arranged to move within and without said cavity, means urging said probe without said cavity, said probe constructed and arranged in relation to the contact face whereby engagement of the stop with an edge of the signal notch urges the probe to within said cavity, and control means spaced from said stop responsive to the movement of the probe to within said cavity, said control means engaged with both the cutting-knife and the movable stop, said control means urging the cutting-knife into the film and then moving the stop so that the contact face thereof is not engaged with the film.

4. A device for severing exposed frames from a strip of moving film bearing a signal notch intermediate exposed frames which includes a cutting-knife, a vertically reciprocal stop normally riding above the strip, means beneath said stop for permitting said stop to pass through the signal notch in the film strip upon the film strip's passage beneath said stop, said stop having a contact face for engaging with an edge of the signal notch, said contact face having a cavity thereon, a sensing probe arranged to move within and without said cavity, means urging said probe without such cavity, said probe constructed and arranged in relation to the contact face whereby engagement of the stop with an edge of the signal notch urges the probe to within said cavity, means proximate said stop and cutting-knife for spreading apart the edges of the signal notch, and cutting-knife operating means spaced from said stop responsive to the movement of the probe within said cavity.

5. A device for severing exposed frames from a strip of moving film bearing a signal notch intermediate exposed frames which includes a cutting-knife, a vertically reciprocal stop normally riding above the strip, means beneath said stop for permitting said stop to pass through the signal notch in the film strip upon the film strip's passage beneath said stop, said stop having a contact face for engaging with an edge of the signal notch, said contact face having a cavity thereon, a sensing probe arranged to move within and without said cavity, means urging said probe without said cavity, said probe constructed and arranged in relation to the contact face whereby engagement of the stop with an edge of the signal notch urges the probe to within said cavity, means proximate said stop and cutting-knife for spreading apart the edges of the signal notch, means on the side of said stop opposite said last-mentioned means for preventing buckling of said film, and cutting-knife operating means spaced from said stop responsive to the movement of the probe within said cavity.

6. A device for severing exposed frames from a strip of moving film bearing a signal notch intermediate exposed frames which includes a cutting-knife, a vertically reciprocal stop normally riding above the strip, means beneath said stop for permitting said stop to pass through the signal notch in the film strip upon the film strip's passage beneath said stop, said stop having a contact face for engaging with an edge of the signal notch, said contact face having a cavity thereon, a sensing probe arranged to move within and without said cavity, means urging said probe without said cavity, said probe constructed and arranged in relation to the contact face whereby engagement of the stop with an edge of the signal notch urges the probe to within said cavity, means proximate said stop and cutting-knife for spreading apart the edges of the signal notch, means on the side of said stop opposite said last-mentioned means for preventing buckling of said film, and control means spaced from said stop responsive to the movement of the probe to within said cavity, said control means engaged with both the cutting-knife and the movable stop, said control means urging the cutting-knife into the film and then moving the stop so that the contact face thereof is not engaged with the film.

7. A device for severing exposed frames from a strip of moving film bearing a signal notch intermediate exposed frames which includes a track for supporting the film strip, guide means above said track for ensuring planar contact between the film strip and track, film feeding means for urging the film strip over said track, said film feeding means comprising an overload clutch which ceases to urge the film strip towards the plane of movement of said cutting-knife when a signal notch edge is engaged with the stop means, a stop superposed above said track having a contact face opposedly situated to the direction of advancement of said film strip, a movable cutting-knife intermediate said feeding means and said stop and contiguous to said stop, an aperture in said track intermediate said stop and feeding means, means projecting through said aperture for urging an edge of the signal notch against said contact face of the stop, sensing means carried by the contact face of said stop for detecting engagement of the edge of the signal notch with said contact face, and cutting-knife driving means responsive to said sensing means for urging said cutting-knife through the strip of film when an edge of the signal notch is engaged with said contact face of the stop.

References Cited in the file of this patent
UNITED STATES PATENTS

| | | |
|---|---|---|
| 734,215 | Bilgram | July 21, 1903 |
| 1,128,518 | Rohland | Feb. 16, 1915 |
| 2,049,135 | Peyser | July 28, 1936 |
| 2,539,401 | Carl et al. | Jan. 30, 1951 |
| 2,607,074 | Slaughter | Aug. 19, 1952 |